United States Patent

Sugama

(10) Patent No.: US 10,429,583 B2
(45) Date of Patent: Oct. 1, 2019

(54) OPTICAL BRANCHING WAVEGUIDE AND OPTICAL MODULE

(71) Applicant: FUJITSU LIMITED, Kawasaki-shi, Kanagawa (JP)

(72) Inventor: Akio Sugama, Atsugi (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/817,789

(22) Filed: Nov. 20, 2017

(65) Prior Publication Data

US 2018/0172904 A1   Jun. 21, 2018

(30) Foreign Application Priority Data

Dec. 19, 2016 (JP) ................. 2016-245526

(51) Int. Cl.
| | |
|---|---|
| *G02B 6/12* | (2006.01) |
| *G02B 6/125* | (2006.01) |
| *G02B 6/42* | (2006.01) |
| *G02B 6/122* | (2006.01) |
| *G02B 6/34* | (2006.01) |

(52) U.S. Cl.
CPC ......... *G02B 6/125* (2013.01); *G02B 6/12004* (2013.01); *G02B 6/4298* (2013.01); *G02B 6/1228* (2013.01); *G02B 6/34* (2013.01); *G02B 6/4246* (2013.01)

(58) Field of Classification Search
CPC .............................. G02B 6/125; G02B 6/1228
USPC .................... 385/27–30, 42, 45, 128–131, 14
See application file for complete search history.

(56) References Cited

U.S. PATENT DOCUMENTS

| | | | |
|---|---|---|---|
| 2007/0211982 A1* | 9/2007 | Tsuda ................. | G02B 6/12014 385/1 |
| 2008/0152277 A1* | 6/2008 | Little .................... | G02B 6/126 385/11 |
| 2012/0224820 A1 | 9/2012 | Onishi | |

(Continued)

FOREIGN PATENT DOCUMENTS

| | | |
|---|---|---|
| JP | 63-070219 | 3/1988 |
| JP | 10-186153 | 7/1998 |
| JP | 2011-191647 | 9/2011 |

(Continued)

OTHER PUBLICATIONS

Luxtera Inc., "Light source approach for silicon photonics transceivers", Sep. 2014, searched on Nov. 8, 2016 by the internet (12 pages).

*Primary Examiner* — Kaveh C Kianni
*Assistant Examiner* — Hung Q Lam
(74) *Attorney, Agent, or Firm* — Fujitsu Patent Center

(57) ABSTRACT

An optical branching waveguide disclosed herein includes: a substrate; a first optical waveguide provided on the substrate; a second optical waveguide provided on the substrate and arranged close to the first optical waveguide; and a cladding layer covering either one of a first portion of the first optical waveguide and a second portion of the second optical waveguide and including an opening the other one of the first portion and the second portion. The effective refractive index of the first optical waveguide at the first portion and the effective refractive index of the second optical waveguide at the second portion become equal in either one of a state where resin is present in the opening and a state where the resin is not present in the opening.

14 Claims, 16 Drawing Sheets

(56) References Cited

U.S. PATENT DOCUMENTS

2017/0176680 A1  6/2017  Oka

FOREIGN PATENT DOCUMENTS

| JP | 2012-181433 | 9/2012 |
| WO | 20160052343 | 4/2016 |

* cited by examiner

OPTICAL BRANCHING WAVEGUIDE AND OPTICAL MODULE

CROSS-REFERENCE TO RELATED APPLICATION(s)

This application is based upon and claims the benefit of priority of the prior Japanese Patent Application No. 2016-245526, filed on Dec. 19, 2016, the entire contents of which are incorporated herein by reference.

FIELD

The embodiments discussed herein are related to an optical branching waveguide and an optical module.

BACKGROUND

Optical communication techniques, capable of transferring large-volume information at high speed, are already put into practical use for long-distance trunk communication systems.

Also, such techniques are developed that connect a plurality of computers by optical fibers and connects wiring boards inside a computer by optical fibers. In these techniques, optical signals are converted into electric signals by optical devices such as optical transceivers connected to optical fibers.

Optical devices are provided with optical waveguides for transferring optical signals. A device which allows an optical waveguide to branch into a plurality of optical paths is called an optical branching waveguide. By utilizing the optical branching waveguide, variations of optical paths can be increased.

However, an optical branching waveguide which can easily allow an optical path to branch is not developed.

Note that the techniques related to the present application are disclosed in the following documents:
Japanese Laid-open Patent Publication No. 10-186153;
Japanese Laid-open Patent Publication No. 63-70219;
Japanese Laid-open Patent Publication No. 2012-181433;
Japanese Laid-open Patent Publication No. 2011-191647;
International Patent Publication no. WO2016/052343;
and
Luxtera Inc., "Light source approach for silicon photonics transceivers", searched on Nov. 8, 2016 by the internet.

SUMMARY

According to one aspect discussed herein, there is provided an optical branching waveguide including: a substrate; a first optical waveguide provided on the substrate; a second optical waveguide provided on the substrate and arranged close to the first optical waveguide; and a cladding layer covering either one of a first portion of the first optical waveguide and a second portion of the second optical waveguide and including an opening, where the opening overlapping the other one of the first portion and the second portion, wherein an effective refractive index of the first optical waveguide at the first portion and an effective refractive index of the second optical waveguide at the second portion become equal in either one of a state where resin is present in the opening and a state where the resin is not present in the opening.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Prior to describing embodiments, matters considered by the inventor of the present application will be described.

It is convenient when the path of an optical signal can easily be switched in an optical device such as an optical transceiver.

In the followings, optical devices capable of switching the optical path of an optical signal will be described.

(First Example)

Figure 1:
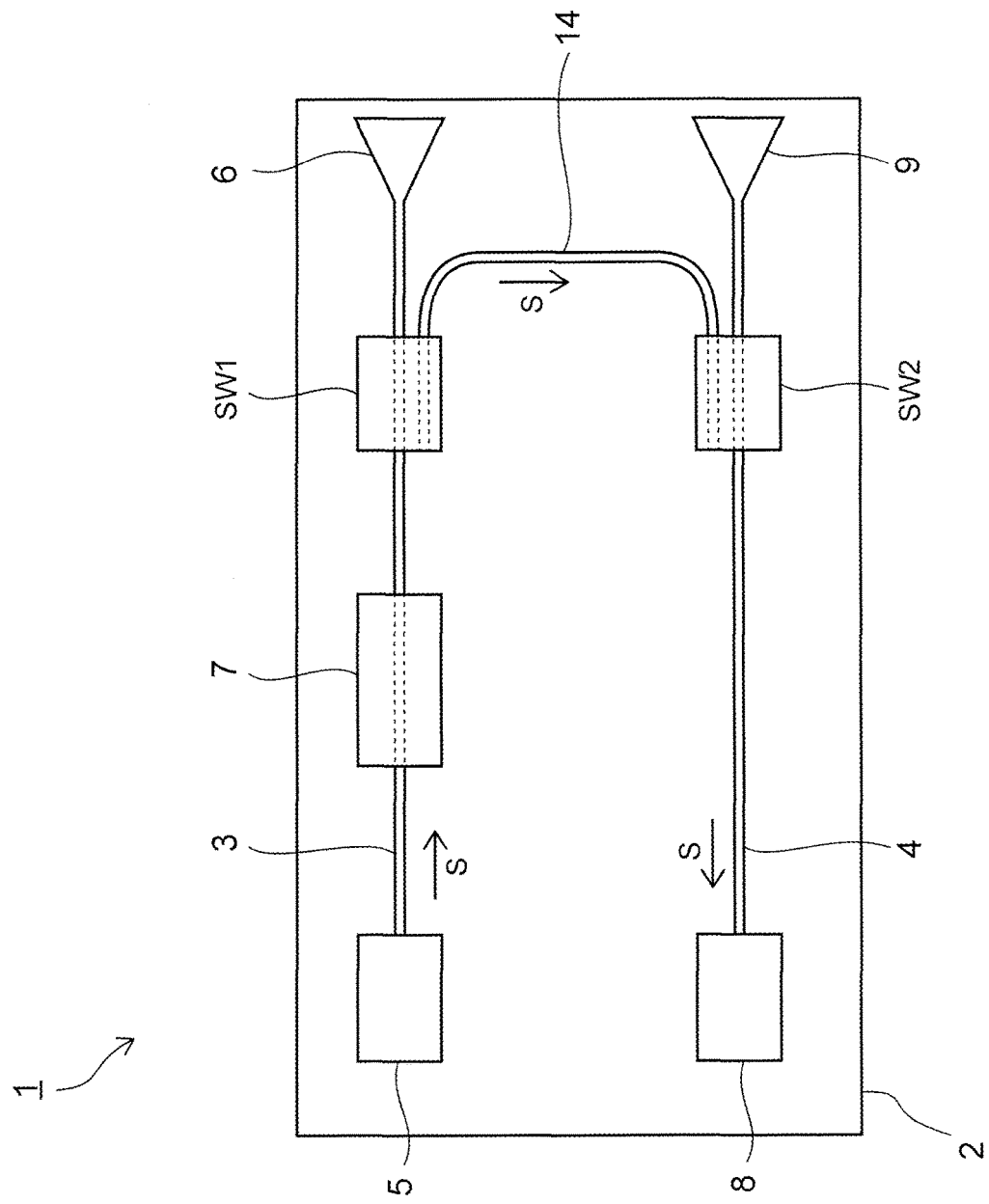
FIG. 1 is a plan view of an optical device according to a first example which the inventor of the present application has considered.

FIG. 1 is a plan view of an optical device according to a first example.

This optical device 1 is an optical transceiver, and includes a substrate 2 and a first optical waveguide 3 and a second optical waveguide 4 formed thereon.

The substrate 2 is a silicon-on-insulator (SOI) substrate, which includes a silicon layer at its uppermost layer, and the optical waveguides 3, 4 are formed by patterning that silicon layer into line shapes by photolithography. Such a manufacturing method of the optical-device that utilizes techniques of processing a silicon layer is called silicon photonics.

A light emitting element 5 and a first grating coupler 6 are provided at the opposite ends of the first optical waveguide 3. Among these, the light emitting element 5 is a laser diode which outputs an optical signal S, and the optical signal S is outputted to the outside from the first grating coupler 6.

Also, at an intermediate point of the first optical waveguide 3, a modulator 7 is provided which modulates the optical signal S outputted from the light emitting element 5 based on an electric signal.

On the other hand, a light receiving element 8 and a second grating coupler 9 are provided at the opposite ends of the second optical waveguide 4. Among these, the light receiving element 8 is a photodiode, and receives an external optical signal S received by the second grating coupler 9 and converts it into an electric signal.

Moreover, a first optical switch SW1 and a second optical switch SW2 to be used in a test of the optical device 1 are provided at the intermediate points of the first optical waveguide 3 and the second optical waveguide 4, respectively. These optical switches SW1, SW2 have a function of switching an optical path in accordance with voltage applied to the unillustrated electrodes, and are connected to a bypass waveguide 14 to which the optical path is switched.

The bypass optical waveguide 14 is fabricated by patterning the silicon layer of the SOI substrate into a line shape, as in the first and second optical waveguides 3, 4. Moreover, when the branching destinations of the optical switches SW1, SW2 are the bypass optical waveguide 14, the first optical waveguide 3 and the second optical waveguide 4 are bypassed via the bypass optical waveguide 14.

Some tests are performed for the optical device 1 to check its performance, when the manufacturing process of the optical device 1 is completed. By providing the first optical switch SW1 and the second optical switch SW2 in the optical device 1 as described above, the tests can be carried out easily as follows.

Consider, for example, a test on the modulator 7. In order to carry out the test when the first switch SW1 is absent, an external optical circuit for testing is connected to the first grating coupler 6 through an optical cable. Then, whether an optical signal S outputted from the light emitting element 5 is modulated as designed by the modulator 7 is checked by the external optical circuit.

In this case, such a problem arises that it is difficult to accurately align the first grating coupler 6 and the optical cable with each other, which in turn requires a long time for preparation of the test. In particular, the optical device 1, which is manufactured by utilizing silicon photonics, is often used in a single mode, which requires alignment with an optical fiber with a high accuracy of about 1 μm. This makes the preparation of the test even more difficult.

In contrast, when the first and second optical switches SW1, SW2 are provided in the optical device 1 as in this example, an optical signal S from the light emitting element 5 can be guided to the light receiving element 8 through the bypass optical waveguide 14 by setting the branching destinations of the optical switches SW1, SW2 to the bypass optical waveguide 14 at the time of testing.

Therefore, the light receiving element 8 can be utilized to test whether or not the optical signal S is modulated as designed by the modulator 7, which can omit to prepare the external optical circuit for testing.

However, these optical switches SW1, SW2 are used only in the test. Once the optical device 1 is shipped as a product, the switches SW1, SW2 are not be used in the actual use. A dedicated electric circuit is needed to drive the switches SW1, SW2, and forming such an electric circuit for the optical switches SW1, SW2, which are used only in the test, is not cost-effective.

Furthermore, even when the optical switches SW1, SW2 are set such that an optical signal will not branch off to the bypass optical waveguide 14 in actual use situations, a significant amount of signal loss is caused by these optical switches. Moreover, part of optical signals S travelling in the optical waveguides 3, 4 may leak to the bypass optical waveguide 14, which causes a crosstalk between these optical waveguides 3, 4.

(Second Example)

Figure 2:
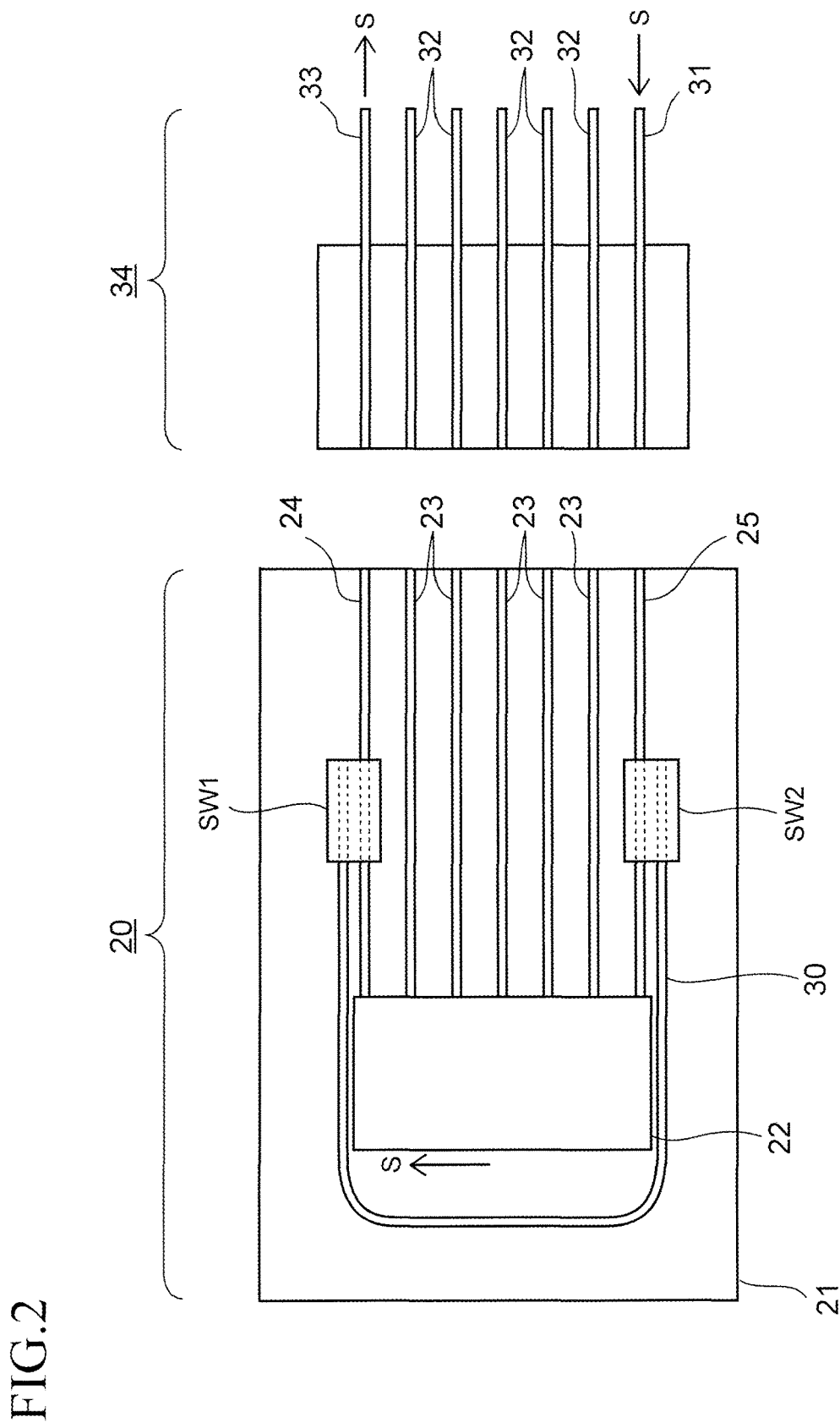
FIG. 2 is a plan view of an optical device according to a second example which the inventor of the present application has considered.

FIG. 2 is a plan view of an optical device according to a second example.

This optical device 20 is a device capable of receiving and outputting a plurality of optical signals, and includes a substrate 21 and an optical integrated circuit 22. The optical integrated circuit 22 is formed on the substrate 21, and receives and outputs the optical signals.

As in the first example, the substrate 21 is an SOI substrate, and a plurality of optical waveguides 23 to 25 for the respective optical signals are famed by patterning the silicon layer at the upper layer of the substrate 21 into line shapes. Moreover, each of the optical waveguides 23 to 25 is connected to the optical integrated circuit 22.

Meanwhile, the optical waveguides 23 to 25 are arranged side by side, and the outermost optical waveguides 24, 25 are provided with a first switch SW1 and a second switch SW2, respectively.

These optical switches SW1, SW2 have a function of switching an optical path in accordance with voltage applied to unillustrated electrodes, and are connected to a bypass waveguide 30 to which the optical path is switched.

Similar to the optical waveguides 23 to 25, the bypass optical waveguide 30 is made by patterning the silicon layer of the SOI substrate into a line shape. When the branching destinations of the optical switches SW1, SW2 are the bypass optical waveguide 30, the outer optical waveguides 24, 25 are bypassed via the bypass optical waveguide 30.

In actual use situations, the optical device 20 is used by being connected to a fiber array 34 including a plurality of optical fibers 31 to 33. Here, when the optical waveguides 23 to 25 and the optical fibers 31 to 33 are misaligned, optical signals cannot be sent and received by these elements.

In this example, since the optical switches SW1, SW2 are provided in the optical device 20 as described above, a test on whether or not the optical waveguides 23 to 25 and the optical fibers 31 to 33 are misaligned can be carried out easily as follows.

In the test, firstly, the branching destinations of the optical switches SW1, SW2 are set to the bypass optical waveguide 30. Then, in this state, an optical signal S for testing is inputted from the outer optical fiber 31.

Here, when the optical device 20 and the fiber array 34 are not misaligned, the optical signal S is outputted to the outside from the outer optical fiber 33 through the bypass optical waveguide 30. Thus, misalignment can be detected based on whether or not the optical signal S is outputted from the optical fiber 33.

However, as in the first example, the optical switches SW1, SW2 are used only in the test. Once the optical device 20 is shipped as a product, the switches SW1, SW2 are never used in actual use situations. Therefore, forming the optical switches SW1, SW2 only for the test is not cost-effective.

In the followings, embodiments capable of easily switching an optical path without using switches will be described.

(First Embodiment)

In the present embodiment, an optical branching waveguide capable of easily switching an optical path will be described.

Figure 3A:
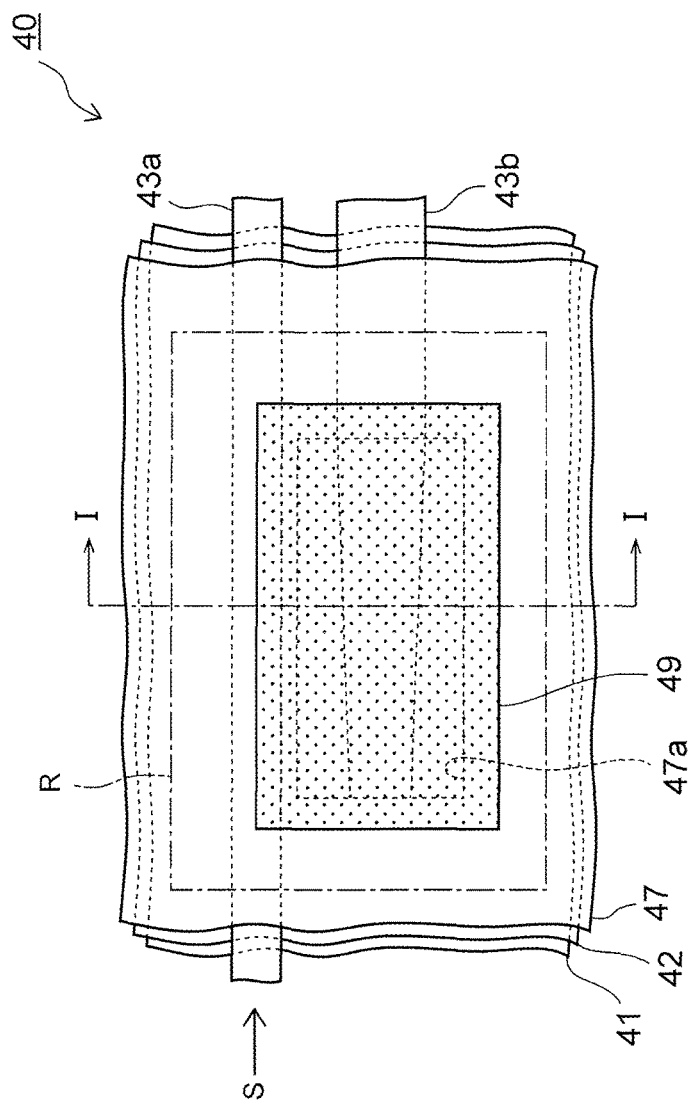
FIG. 3A is a plan view of an optical branching waveguide according to a first embodiment.

FIG. 3A is a plan view of the optical branching waveguide according to the present embodiment.

As illustrated in FIG. 3A, this optical branching waveguide 40 includes a silicon substrate 41 and a silicon oxide layer 42 formed thereon and having a thickness of about 2 µm to 3 µm.

On the silicon oxide layer 42, first and second optical waveguides 43a, 43b are provided close to each other. These optical waveguides 43a, 43b are formed by patterning a silicon layer having a thickness of about 200 nm into line shapes. Then, the silicon oxide layer 42 functions as a lower cladding layer for the optical waveguides 43a, 43b.

The optical waveguides 43a, 43b, made of silicon as described above, receive an optical signal S in an infrared region whose wavelengths is about 1.3 µm to 1.5 µm.

The layout of the optical waveguides 43a, 43b is not particularly limited. In this example, the optical waveguides 43a, 43b are arranged side by side in a partial region R of the silicon substrate 41 so that the optical path can be switched between these optical waveguides 43a, 43b.

Moreover, a silicon oxide layer is famed as a cladding layer 47 to a thickness of about 1 µm on the optical waveguides 43a, 43b, and the first optical waveguide 43a is covered by the cladding layer 47.

Further, an opening 47a having a rectangular shape in a plan view is famed in the cladding layer 47. The opening 47a is provided at a position overlapping the second optical waveguide 43b, and resin 49 is filled in the opening 47a.

Note that, in the plan view, the opening 47a is formed to overlap only the second optical waveguide 43b and does not overlap the first optical waveguide 43a.

Figure 3B:
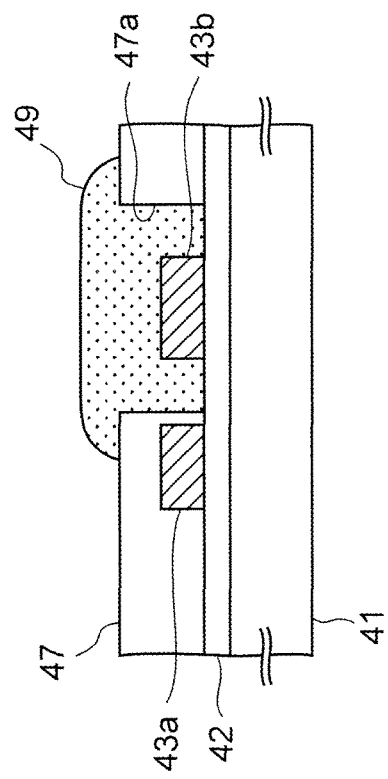
FIG. 3B is a cross-sectional view taken along line I-I of FIG. 3A.

FIG. 3B is a cross-sectional view taken along line I-I of FIG. 3A.

As illustrated in FIG. 3B, side surfaces and un upper surface of the first optical waveguide 43a are covered by the cladding layer 47.

On the other hand, the second optical waveguide 43b in the opening 47a has side surfaces and an upper surface covered by the resin 49.

The resin 49 is an optical adhesive having a refractive index of about 1.50 to 1.55, which is greater than or equal to the refractive index (about 1.45) of each of the silicon oxide layer 42 and the cladding layer 47. In this example, the resin 49 is filled into the opening 47a with an unillustrated dispenser, and the resin 49 is then solidified by any of methods of natural drying, ultraviolet irradiation, and heating.

Note that, in place of the solid resin 49, glycerin (refractive index: 1.47), which is a liquid resin having a refractive index greater than or equal to that of the cladding layer 47, or cooking oil (refractive index: 1.46 to 1.47) may be filled in the opening 47a.

In this optical branching waveguide 40, the optical path can be switched depending whether the resin 49 is present in the opening 47a or not as follow.

Figure 4A:
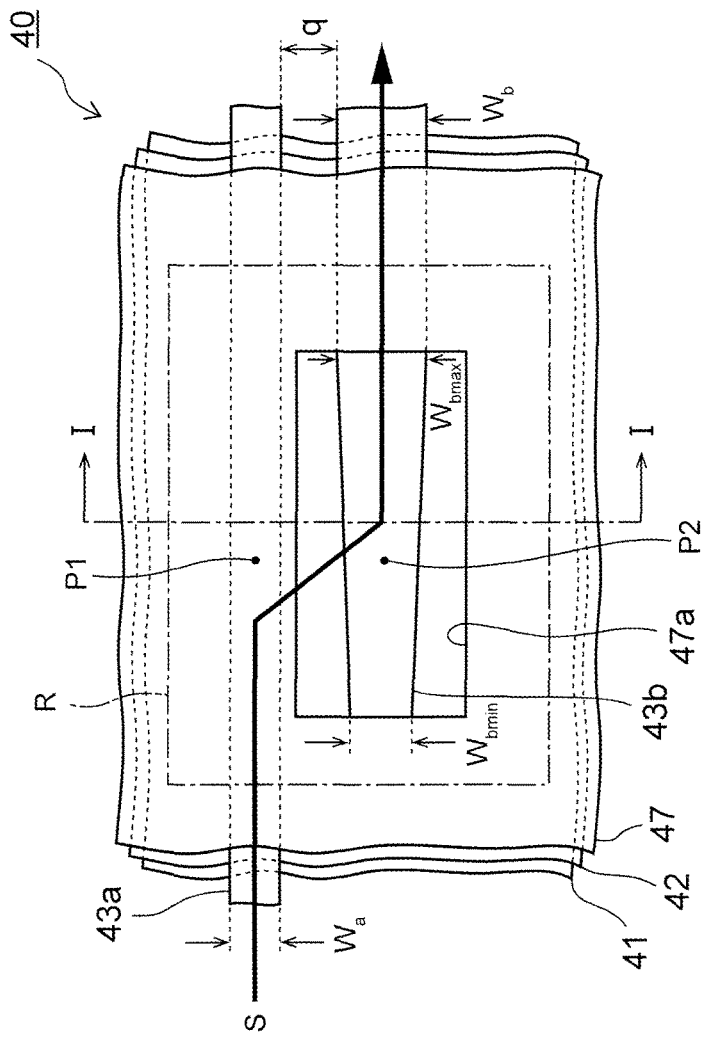
FIG. 4A is a plan view for describing the operation of the optical branching waveguide according to the first embodiment in a case where resin is not present.
Figure 4B:
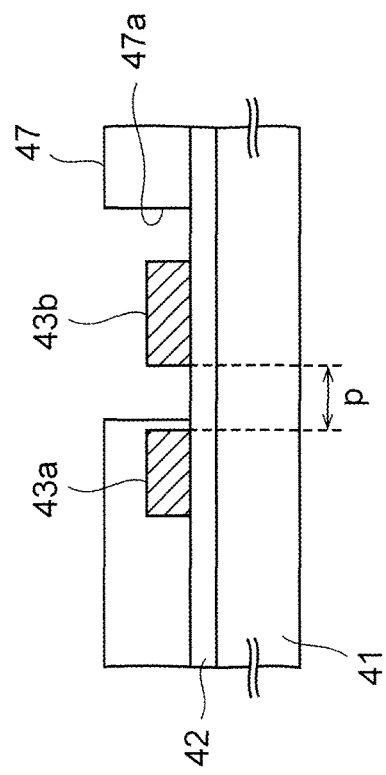
FIG. 4B is a cross-sectional view taken along line I-I of FIG. 4A.

FIG. 4A is a plan view for describing the operation of the optical branching waveguide 40 in the case where the resin 49 is not present, and FIG. 4B is a cross-sectional view taken along line I-I of FIG. 4A.

In the example of FIGS. 4A and 4B, the resin 49 is not filled in the opening 47a, so that air is present in the opening 47a.

Also, the first optical waveguide 43a is like a line shape, whose first width $W_a$ is fixed along the extending direction of the first optical waveguide 43a. Although the first width $W_a$ is not particularly limited, the first width $W_a$ is about 200 nm in this example.

On the other hand, the second optical waveguide 43b is like a tapered shape, whose second width $W_b$ becomes smaller toward the tip of the second optical waveguide 43b. In this example, each of a minimum value $W_{bmin}$ and a maximum value $W_{bmax}$ of the second width $W_b$ is set to be greater than the first width $W_a$. The minimum value $W_{bmin}$ is about 220 nm, and the maximum value $W_{bmax}$ is about 250 nm, for example.

Note that a gap q between the first optical waveguide 43a and the second optical waveguide 43b is preferably narrow enough for the optical signal S to jump between these optical waveguides 43a, 43b, and the gap q is set to 500 nm in this example.

Here, when the structures of the first optical waveguide 43a and the second optical waveguide 43b are similar to each other, the optical signal S travelling in the first optical waveguide 43a may jump to the second optical waveguide 43b, or conversely the optical signal S may jump from the second optical waveguide 43b to the first optical waveguide 43a.

As an index indicating how it is easy for the optical signal S to jump between the optical waveguides 43a, 43b, the effective refractive indexes of these optical waveguides 43a, 43b are employed in this embodiment.

The effective refractive index of an optical waveguide is determined by the refractive index of the optical waveguide itself, the width of the optical waveguide, and the refractive index of the material surrounding the optical waveguide.

For example, the smaller the refractive index of the material surrounding the optical waveguide, the smaller the effective refractive index of that optical waveguide.

Moreover, when the effective refractive indexes of the first optical waveguide 43a and the second optical waveguide 43b are closer, the optical signal S can easily jump between these optical waveguides 43a, 43b.

In other words, when the effective refractive indexes of the two optical waveguides are close, the widths of the optical waveguides seen from the optical signal S appear as the same width. Therefore, it can also be said that switching of the optical path occurs when the widths of the optical waveguides seen from the optical signal S are equal.

As illustrated in FIG. 4A, the cladding layer 47 is present around the first optical waveguide 43a, whereas air is present around the portion of the second optical waveguide 43b exposed from the opening 47a. Thus, the refractive indexes of the materials around the first and the second optical waveguide 43a, 43b are different.

Therefore, when the widths of the first optical waveguide 43a and the second optical waveguide 43b are completely equal, their effective refractive indexes are different. In particular, filling air in the opening 47a is effective to reducing the width of the second optical waveguide 43b seen from the optical signal S as compared to the case where the cladding layer 47 is provided in the opening 47a.

In this case, the effective refractive indexes of the optical waveguides 43a, 43b are different when seen from the optical signal S, which makes it impossible for the optical signal S to jump between the optical waveguides 43a, 43b.

To deal with this problem, in this example, the maximum value $W_{bmax}$ of the second width $W_b$ of the second optical waveguide 43b is set to be greater than the first width $W_a$ of the first optical waveguide 43a, so that the effective refractive indexes of the optical waveguides 43a, 43b seen from the optical signal S are made equal to each other.

In this way, the optical signal S travelling in the first optical waveguide 43a jumps to the second optical waveguide 43b. Hence, the optical path of the optical signal S can be switched from the first optical waveguide 43a to the second optical waveguide 43b.

Such a switching of the optical path occurs near the portions where the effective refractive indexes of the first optical waveguide 43a and the second optical waveguide 43b equal.

The example of FIG. 4A assumes that the effective refractive indexes of the first optical waveguide 43a and the second optical waveguide 43b are equal at a first portion P1 of the first optical waveguide 43a and a second portion P2 of the second optical waveguide 43b, and that the optical path is switched near these portions P1, P2.

As mentioned above, the effective refractive index of an optical waveguide depends on its width. Therefore, when the width of each optical waveguide 43a, 43b varies due to a manufacturing error and the like, the portions P1, P2, at which the effective refractive indexes become equal, are less likely to be generated.

In this example, the second optical waveguide 43b is of the tapered shape. This makes it possible for the portion P2, which is equal in effective refractive index to the portion P1, to be generated on the tapered second optical waveguide 43b even when the width of each optical waveguide 43a, 43b varies.

In particular, a gap p (see FIG. 4B) between the optical waveguides 43a, 43b is preferably set to be wide in order to avoid overlap of a side face of the opening 47a with the second optical waveguide 43b. In this case, however, the tolerance for the variation in the width of each optical waveguide 43a, 43b for forming the portions P1, P2 is difficult to ensure. Thus, the tapered second optical waveguide 43b is particularly beneficial in the case where the gap p is set to be wide due to the opening 47a.

Next, description will be given of the operation in the case where the resin 49 is filled in the opening 47a in the optical branching waveguide 40 with the same structure as FIGS. 4A and 4B.

Figure 5:
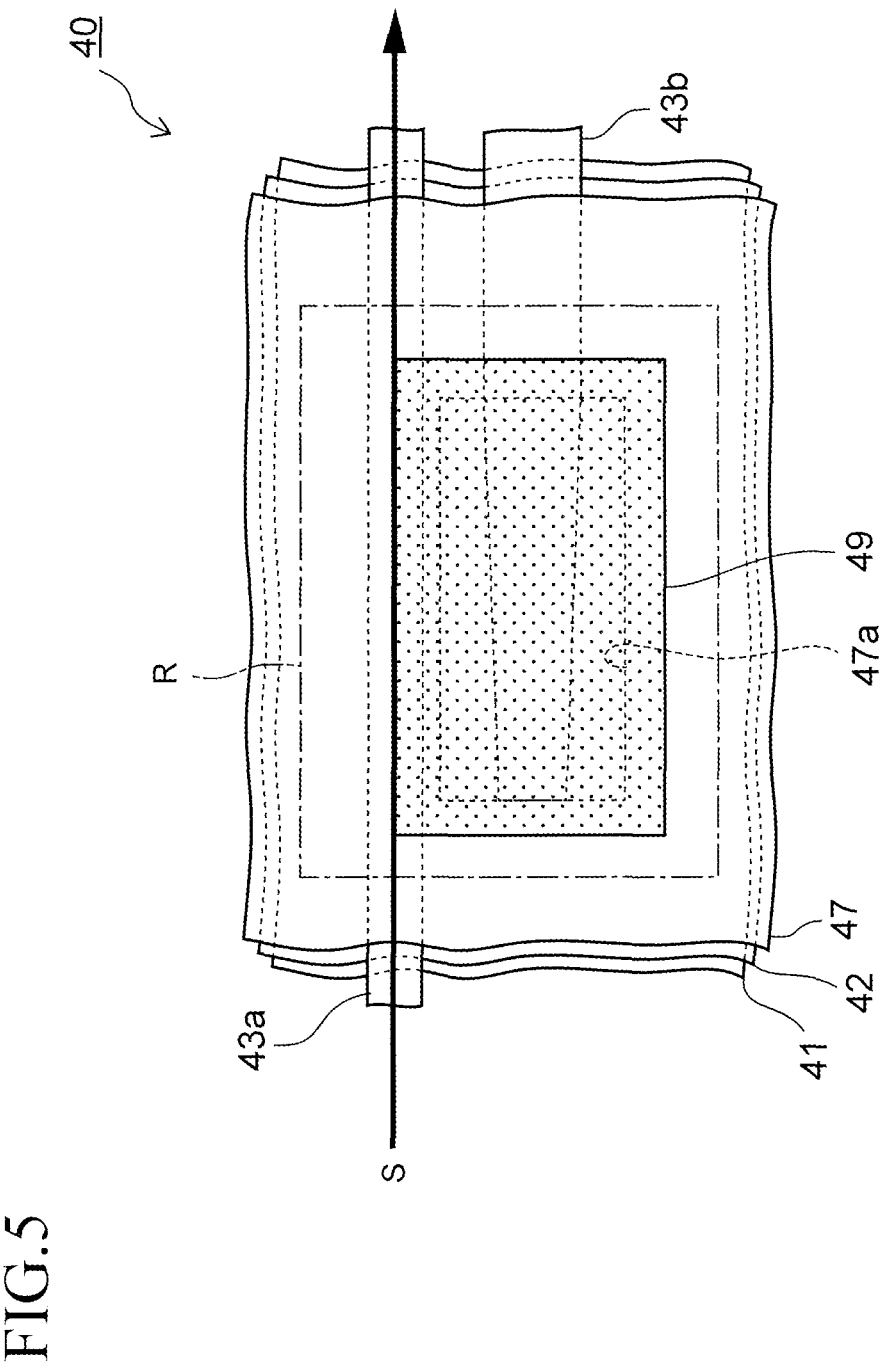
FIG. 5 is a plan view for describing the operation of the optical branching waveguide according to the first embodiment in a case where resin is present.

FIG. 5 is a plan view for describing the operation of the optical branching waveguide 40 in the case where the resin 49 is present.

Note that the widths of the optical waveguides 43a, 43b are the same as those in FIG. 4A, and hence the description thereof will be omitted.

As mentioned earlier, the refractive index of the resin 49 has a value greater than or equal to the refractive index of the cladding layer 47. Thus, filling the resin 49 in the opening 47a changes the effective refractive index of the second optical waveguide 43b as compared to the case where the resin 49 is not present, and can therefore offer an effect effective to increasing the width of the second optical waveguide 43b seen from the optical signal S.

Consequently, when seen from the optical signal S, the structures of the first optical waveguide 43a and the second optical waveguide 43b appear differently, so that the optical signal S travels straight in the first optical waveguide 43a without branching off to the second optical waveguide 43b.

In this manner, according to the optical branching waveguide 40 of the present embodiment, the optical path of the optical signal S can be easily changed depending whether the resin 49 is present or not. Therefore, depending on whether the resin 49 is filled in the opening 47a or not, it is possible to easily construct an optical path as intended by the designer, and also conveniently switch the optical path temporarily only at the time of the test.

In addition, since the optical path can be changed depending on whether the resin 49 is present or not in this manner, an electronic circuit for changing the optical path is not needed. Accordingly, the cost of the optical branching waveguide 40 can be reduced.

In particular, in this example, the opening 47a is formed to overlap only one of the first optical waveguide 43a and the second optical waveguide 43b in a plan view, and the opening 47a does not overlap the other wave guide in plan view. This makes it possible to easily change only the effective refractive index of the one of the first optical waveguide 43a and the second optical waveguide 43b that overlaps the opening 47a. It is therefore easy to make the effective refractive indexes of the first and the second optical waveguide 43a, 43b equal.

The inventor of the present application confirmed whether the optical path can be actually changed by the resin 49 by simulations.

FIGS. 6A and 6B and FIGS. 7A and 7B illustrate the result.

Figure 6A:
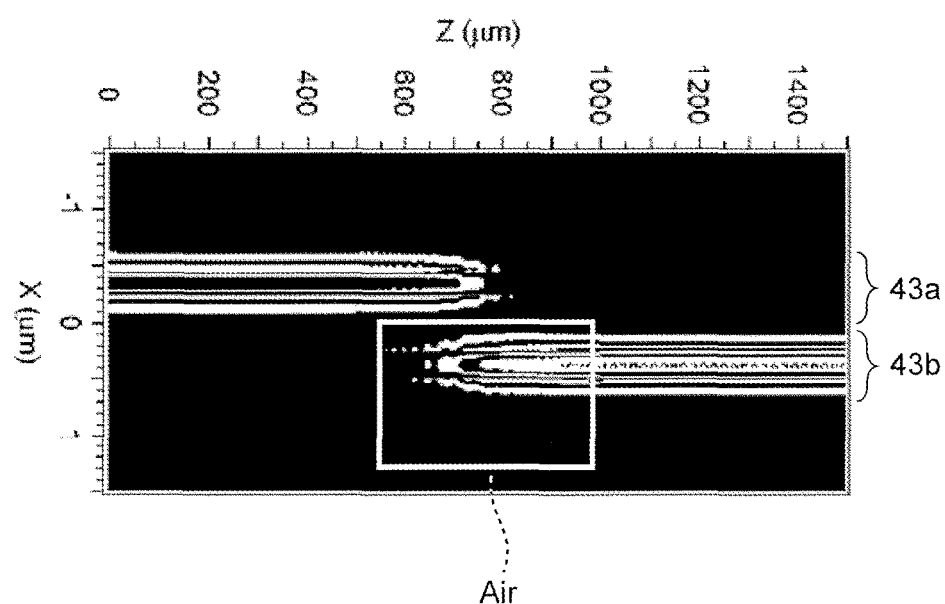
FIG. 6A is a diagram obtained by simulating the intensity of an optical signal in the case where air is left in an opening in the first embodiment.

FIG. 6A is a diagram obtained by simulating the intensity of the optical signal S in the case where the resin 49 is not filled in the opening 47a but air is present in the opening 47a as in FIG. 4A.

Note that the horizontal axis of FIG. 6A represents a distance Z along the extending direction of the optical waveguides 43a, 43b, while the vertical axis represents a distance X along a direction perpendicular to that extending direction. Also, in FIG. 6A, portions at which the intensity of the optical signal S is high are depicted in white. This is also the case for FIG. 7A to be mentioned later.

As illustrated in FIG. 6A, it was actually confirmed that the optical path of the optical signal switches from the first optical waveguide 43a to the second optical waveguide 43b when air is present in the opening 47a.

Figure 6B:
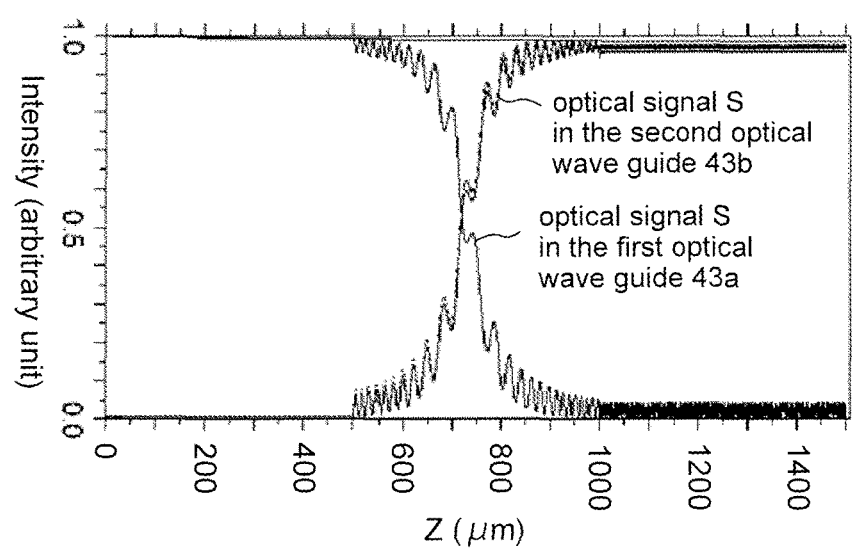
FIG. 6B is a graph illustrating the intensity of the optical signal propagating in each of a first optical waveguide and a second optical waveguide in the above case.

Meanwhile, FIG. 6B is a graph illustrating the intensity of the optical signal S propagating in each of the first optical waveguide 43a and the second optical waveguide 43b in the above case. The horizontal axis of this graph represents the above-mentioned distance Z, while the vertical axis of the graph represents the intensity of the optical signal S.

As illustrated in FIG. 6B, 96% or more of the entire power of the optical signal S propagating in the first optical waveguide 43a moves to the second optical waveguide 43b. It is confirmed from this fact also that the optical path can be switched when the air is present in the opening 47a.

Figure 7A:
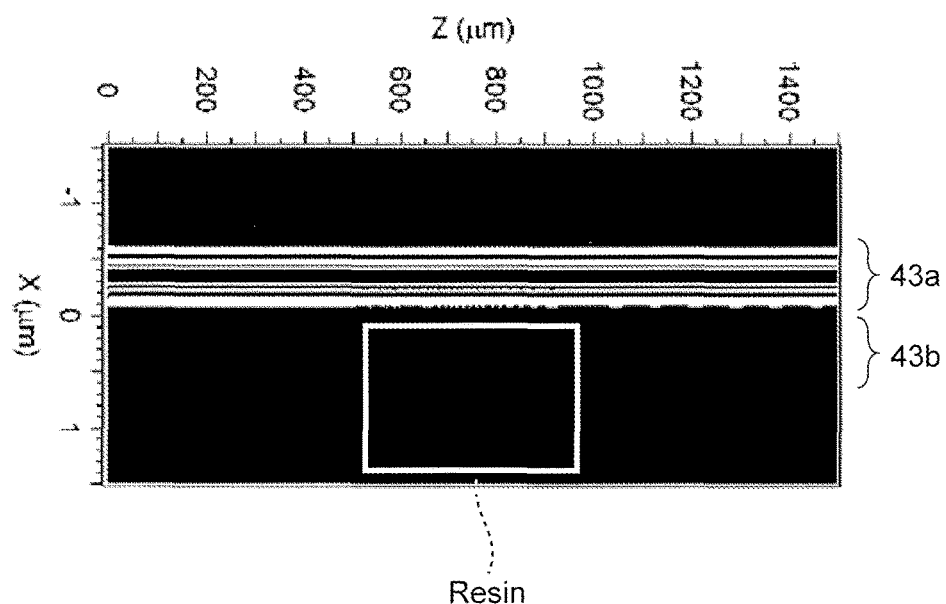
FIG. 7A is a diagram obtained by simulating the intensity of an optical signal in the case where resin is filled in the opening in the first embodiment.

On the other hand, FIG. 7A is a diagram obtained by simulating the intensity of the optical signal in the case where the resin 49 is filled in the opening 47a as in FIG. 5.

As illustrated in FIG. 7A, it is actually confirmed that the optical signal travels straight in the first optical waveguide 43a and its optical path does not branch off to the second optical waveguide 43b when the resin 49 is filled in the opening 47a.

Figure 7B:
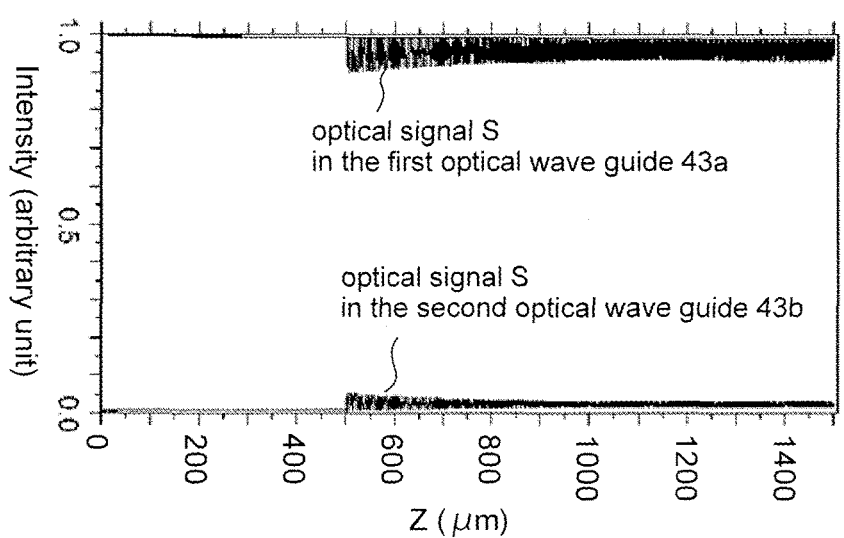
FIG. 7B is a graph illustrating the intensity of the optical signal propagating in each of the first optical waveguide and the second optical waveguide in the above case.

Meanwhile, FIG. 7B is a graph illustrating the intensity of the optical signal propagating in each of the first optical waveguide 43a and the second optical waveguide 43b in the above case. The definitions of the vertical axis and the horizontal axis of the graph are the same as those of FIG. 6B.

As illustrated in FIG. 7B, 95% or more of the entire power of the optical signal S propagating in the first optical waveguide 43a remains in the first optical waveguide 43a. It was confirmed from this result that the optical path does not branch off when the resin 49 is filled in the opening 47a.

Next, variations of the shapes of the optical waveguides 43a, 43b will be described.

Those variations include a pattern 1 to a pattern 4, as illustrated in FIGS. 8 to 11. Each of these will be described.

<Pattern 1>

Figure 8:
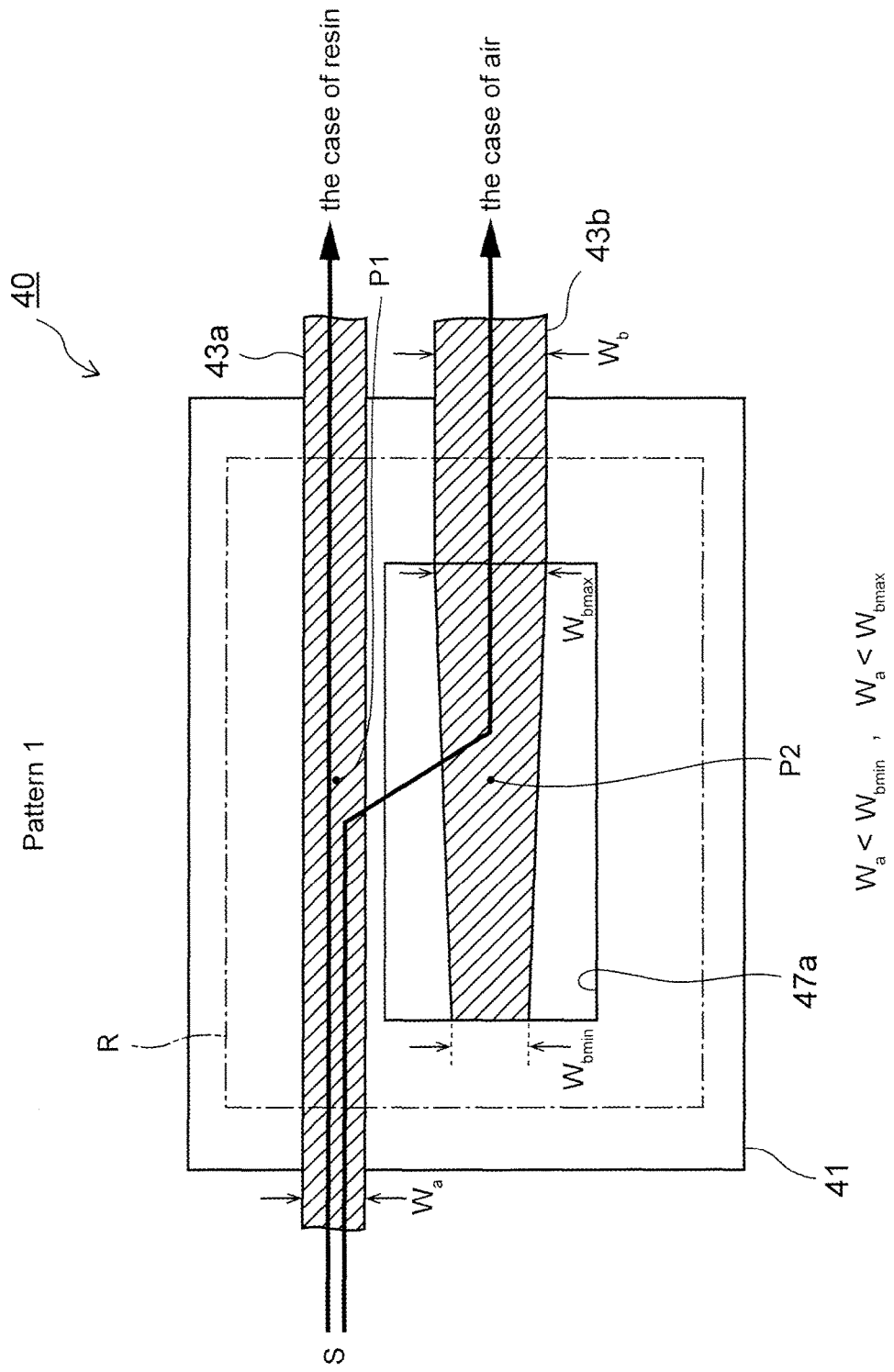
FIG. 8 is a schematic plan view of the optical branching waveguide with a pattern 1 according to the first embodiment.

FIG. 8 is a schematic plan view of the optical branching waveguide 40 of the pattern 1.

The pattern 1 is the same pattern as FIGS. 4A and 5, in which $W_a < W_{bmin}$ and $W_a < W_{bmax}$, as described above.

In this pattern, the optical path branches off when air is present in the opening 47a, while the optical signal S travels straight in the first optical waveguide 43a when the resin 49 is filled in the opening 47a as described above.

<Pattern 2>

Figure 9:
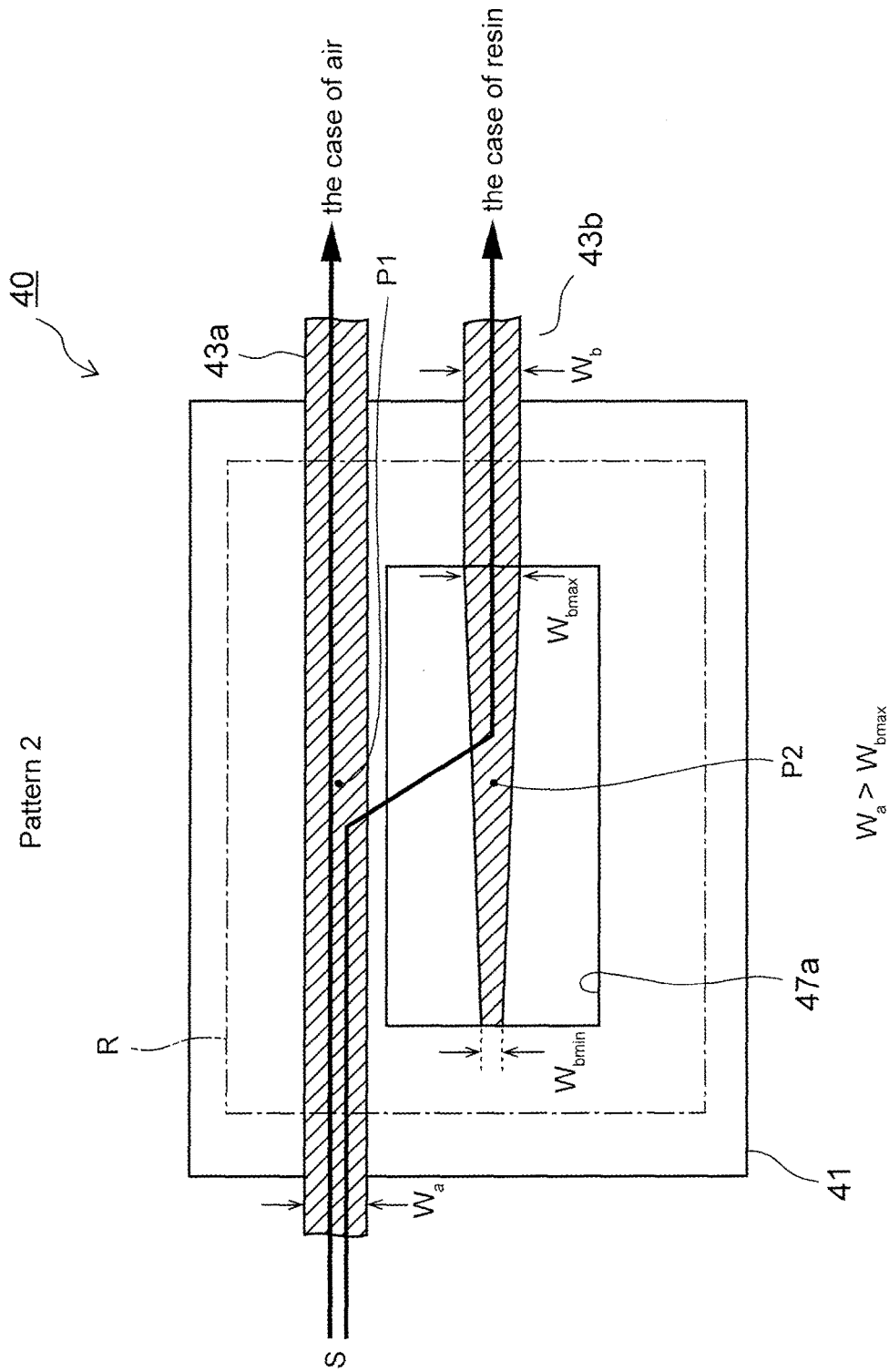
FIG. 9 is a schematic plan view of the optical branching waveguide with a pattern 2 according to the first embodiment.

FIG. 9 is a schematic plan view of the optical branching waveguide 40 of the pattern 2.

The pattern 2 is a pattern with which the optical signal S travels straight in the first optical waveguide 43a when air is present in the opening 47a, while the switching of the optical path occurs when the resin 49 is filled in the opening 47a.

In this example, as in the pattern 1, the first width $W_a$ of the first optical waveguide 43a is fixed. However, the relationship between the first width $W_a$ and the maximum value $W_{bmax}$ of the second width $W_b$ is $W_a > W_{bmax}$.

As mentioned earlier, filling air in the opening 47a is effective to reducing the width of the second optical waveguide 43b seen from the optical signal S.

Therefore, when the relationship $W_a > W_{bmax}$ is hold in this manner, the effective refractive index of the second optical waveguide 43b becomes further less than the effective refractive index of the first optical waveguide 43a seen from the optical signal S.

As a result, in the state where air is present in the opening 47a, there are no portions within the partial region R at which the effective refractive indexes of the first optical waveguide 43a and the second optical waveguide 43b become equal. Hence, the branching off of the optical path does not occur, and the optical signal S travels straight in the first optical waveguide 43a.

On the other hand, when the resin 49 is filled in the opening 47a, the effective refractive index of the second optical waveguide 43b in the opening 47a becomes large seen from the optical signal S.

As a result, there are the portions P1, P2 within the partial region R, at which the effective refractive indexes of the first optical waveguide 43a and the second optical waveguide 43b are equal. Hence, the switching of the optical path occurs near these portions P1, P2.

Note that when the maximum value $W_{bmax}$ is too small, there exist no portions at which the effective refractive indexes of the optical waveguides 43a, 43b are equal seen from the optical signal S even when the resin 49 is filled in the opening 47a. For this reason, the maximum value $W_{bmax}$ is preferably set to be slightly less than the first width $W_a$.

<Pattern 3>

Figure 10:
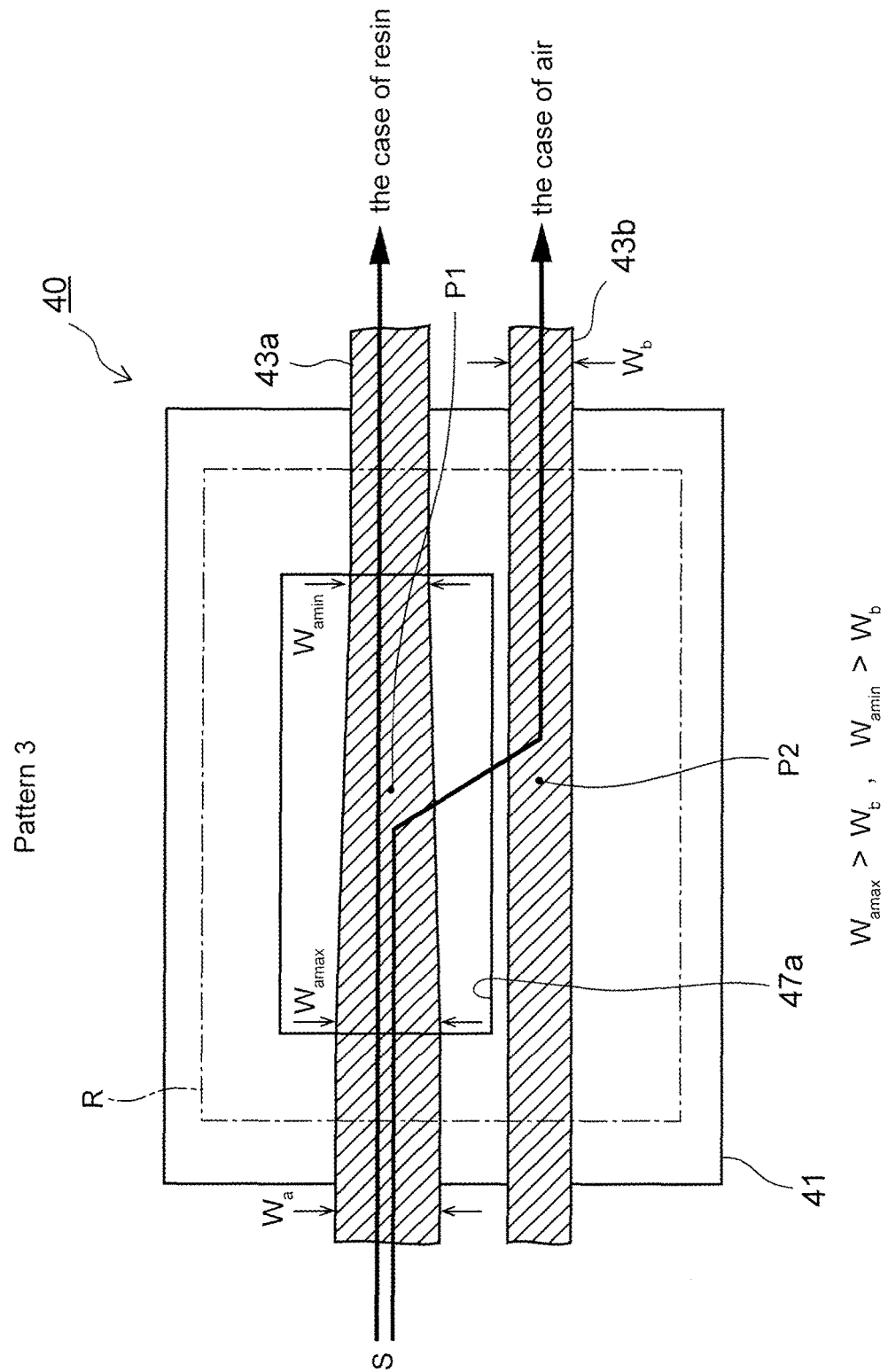
FIG. 10 is a schematic plan view of the optical branching waveguide with a pattern 3 according to the first embodiment.

FIG. 10 is a schematic plan view of the optical branching waveguide of the pattern 3.

The pattern 3 is a pattern with which the optical signal S travels straight in the first optical waveguide 43a when the resin 49 is filled in the opening 47a, while the switching of the optical path occurs when air is present in the opening 47a.

In this example, the opening 47a is formed to overlap the first optical waveguide 43a, and the second optical waveguide 43b is covered by the cladding layer 47 (see FIG. 5).

Note that the second width $W_b$ of the second optical waveguide 43b is fixed along the extending direction of the second optical waveguide 43b. Moreover, the first width $W_a$ of the portion of the first optical waveguide 43a overlapping the opening 47a is changed like a taper, and also a minimum value $W_{min}$ of the first width $W_a$ of the portion overlapping the opening 47a is set to be greater than the second width $W_b$. Moreover, a maximum value $W_{max}$ of the first width $W_a$ of the portion overlapping the opening 47a is also set to be greater than the second width $W_b$.

Filling air in the opening 47a is effective to reducing the width of the first optical waveguide 43a seen from the optical signal S.

Thus, although the minimum value $W_{amin}$ is set to be greater than the second width $W_b$ in this manner, the effective refractive index of the first optical waveguide 43a becomes small when seen from the optical signal S. Hence, there exist the portions P1, P2, at which the effective refractive indexes of the optical waveguides 43a, 43b become equal seen from the optical signal S. As a result, the switching of the optical path occurs near these portions P1, P2.

On the other hand, filling the resin 49 in the opening 47a can offer an effect effective to increasing the width of the first optical waveguide 43a when seen from the optical signal S. Therefore, when the minimum value $W_{amin}$ is set to be greater than the second width $W_b$ as in this example, there cannot be any portions at which the effective refractive indexes of the optical waveguides 43a, 43b become equal when seen from the optical signal S. Hence, the switching of the optical path does not occur, and the optical signal S travels straight in the first optical waveguide 43a.

<Pattern 4>

Figure 11:
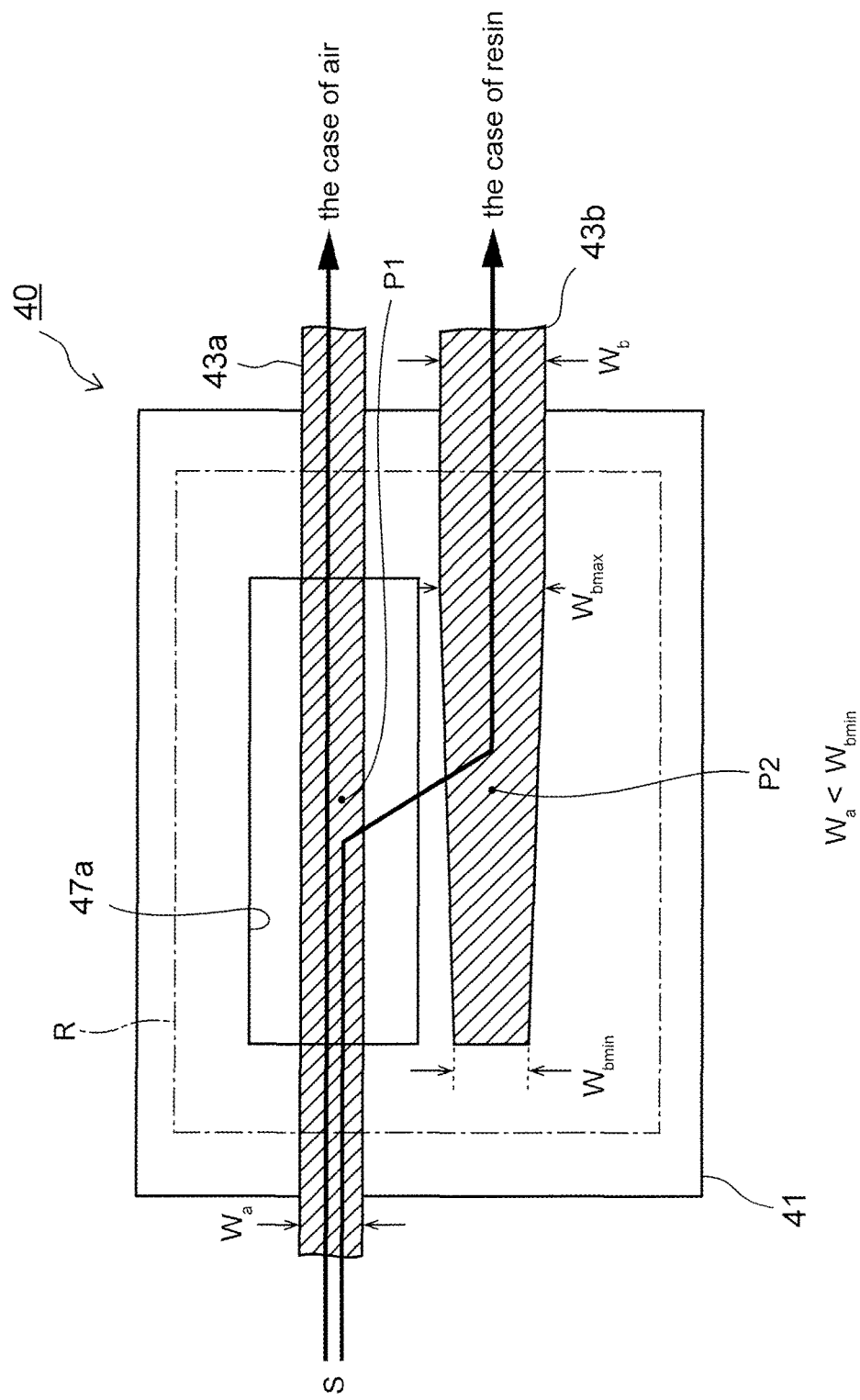
FIG. 11 is a schematic plan view of the optical branching waveguide with a pattern 4 according to the first embodiment.

FIG. 11 is a schematic plan view of the optical branching waveguide 40 of the pattern 4.

The pattern 4 is a pattern with which the optical signal S travels straight in the first optical waveguide 43a when air is present in the opening 47a, while the switching of the optical path occurs when the resin 49 is filled in the opening 47a.

In this example, as in the pattern 3, the opening 47a is formed to overlap the first optical waveguide 43a, and the second optical waveguide 43b is covered by the cladding layer 47 (see FIG. 5).

However, unlike the pattern 3, the first width $W_a$ of the first optical waveguide 43a is fixed along the extending direction of the first optical waveguide 43a.

On the other hand, the second width $W_b$ of the second optical waveguide 43b beside the opening 47a is changed like a taper, and each of the minimum value $W_{bmin}$ and the maximum value $W_{bmax}$ of the second width $W_b$ are set to be greater than the first width $W_a$.

As mentioned earlier, filling air in the opening 47a is effective to reducing the width of the first optical waveguide 43a when seen from the optical signal S.

Therefore, when the minimum value $W_{bmin}$ is set to be greater than the first width $W_a$ in this manner, there are no portions within the partial region R at which the effective refractive indexes of the first optical waveguide 43a and the second optical waveguide 43b become equal in the state where air is present in the opening 47a. Hence, the branching off of the optical path does not occur, and the optical signal S travels straight in the first optical waveguide 43a.

On the other hand, filling the resin 49 in the opening 47a increases the effective refractive index of the first optical waveguide 43a. As a result, there exist the portions P1, P2 within the partial region R, at which the effective refractive indexes of the first optical waveguide 43a and the second optical waveguide 43b become equal. Hence, the switching of the optical path occurs near these portions P1, P2.

Note that when the minimum value $W_{bmin}$ is too large, there exists no portions at which the effective refractive indexes of the optical waveguides 43a, 43b become equal even when the resin 49 is filled in the opening 47a. For this reason, the minimum value $W_{bmin}$ is preferably set to be slightly greater than the first width $W_a$.

Next, a method of manufacturing the optical branching waveguide 40 according to the present embodiment will be described.

FIGS. 12A to 12E are cross-sectional views of the optical branching waveguide 40 in the course of manufacturing thereof according to the present embodiment.

In the following, the description will be given by using a method of manufacturing the optical branching waveguide with the pattern 1 in FIG. 8 as an example.

Figure 12A:
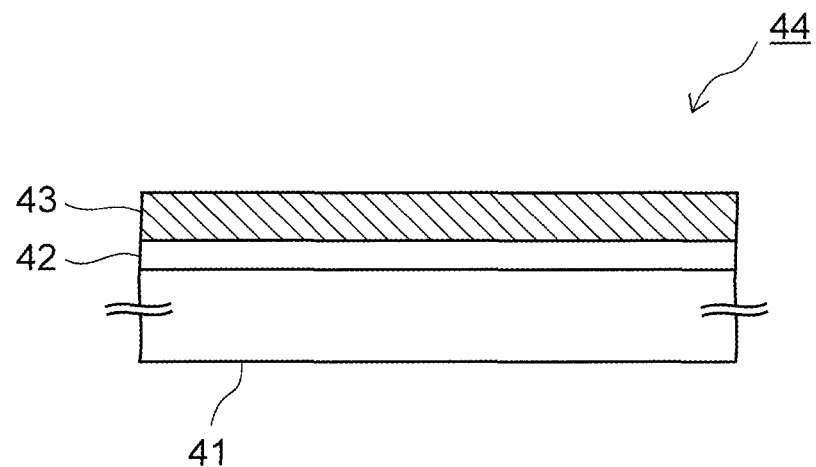
FIGS. 12A to 12E are cross-sectional views of the optical branching waveguide in the course of manufacturing thereof according to the first embodiment.

First, as illustrated in FIG. 12A, an SOI substrate is prepared which includes a silicon substrate 41, a silicon oxide layer 42, and a silicon layer 43 stacked in this order.

The thickness of each layer is not particularly limited. In this example, the thickness of the silicon oxide layer 42 is 2 μm to 3 μm, and the thickness of the silicon layer 43 is about 200 nm.

Meanwhile, the silicon oxide layer 42, buried between the silicon substrate 41 and the silicon layer 43, is also called buried oxide (BOX).

Figure 12B:
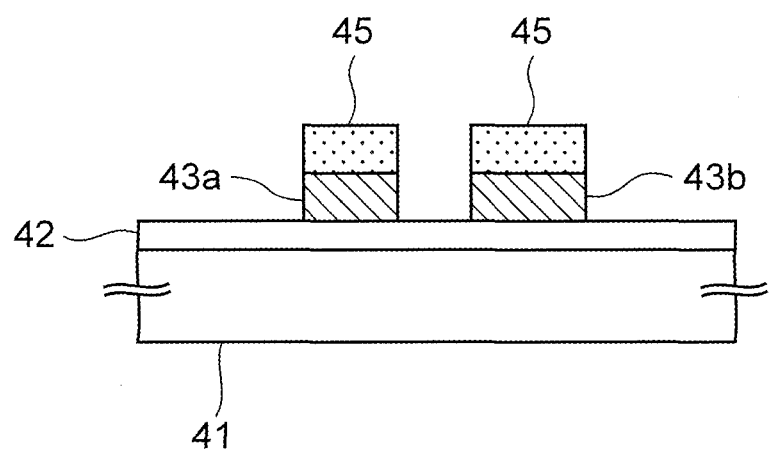

Next, as illustrated in FIG. 12B, a photoresist is applied onto the silicon layer 43 and is then subjected to exposure and development to foam a first resist layer 45.

Then, while using the first resist layer 45 as a mask, the silicon layer 43 is dry-etched to form the first optical waveguide 43a and the second optical waveguide 43b. Note that the etching gas used in this dry etching includes HBr gas, for example.

Thereafter, the first resist layer 45 is removed.

Figure 12C:
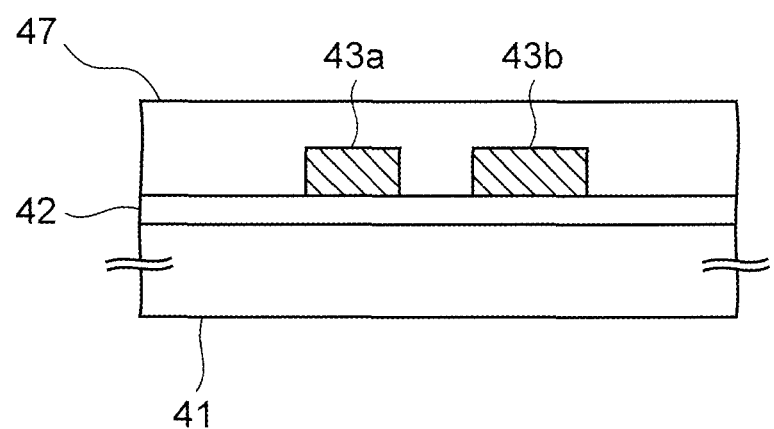

Next, as illustrated in FIG. 12C, a silicon oxide layer is formed as the cladding layer 47 to a thickness of about 1 μm on the silicon oxide layer 42 and the optical waveguides 43a, 43b by chemical vapor deposition (CVD).

Figure 12D:
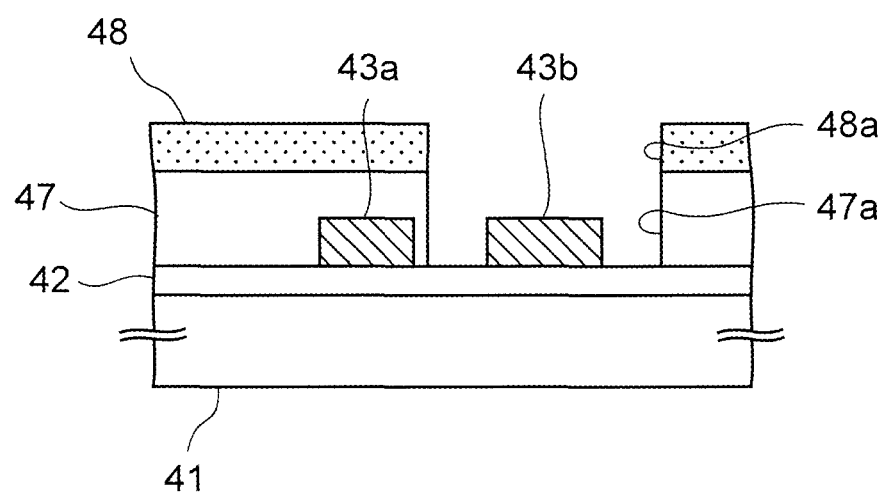

Subsequently, as illustrated in FIG. 12D, a photoresist is applied onto the cladding layer 47 and is then subjected to exposure and development to foam a second resist layer 48 in which an opening 48a is formed over the second optical waveguide 43b.

Then, the cladding layer 47 is dry-etched through the opening 48a by using $CF_4$ gas as the etching gas to form the opening 47a, thereby exposing the second optical waveguide 43b in the opening 47a.

After that, the second resist layer 48 is removed.

Figure 12E:
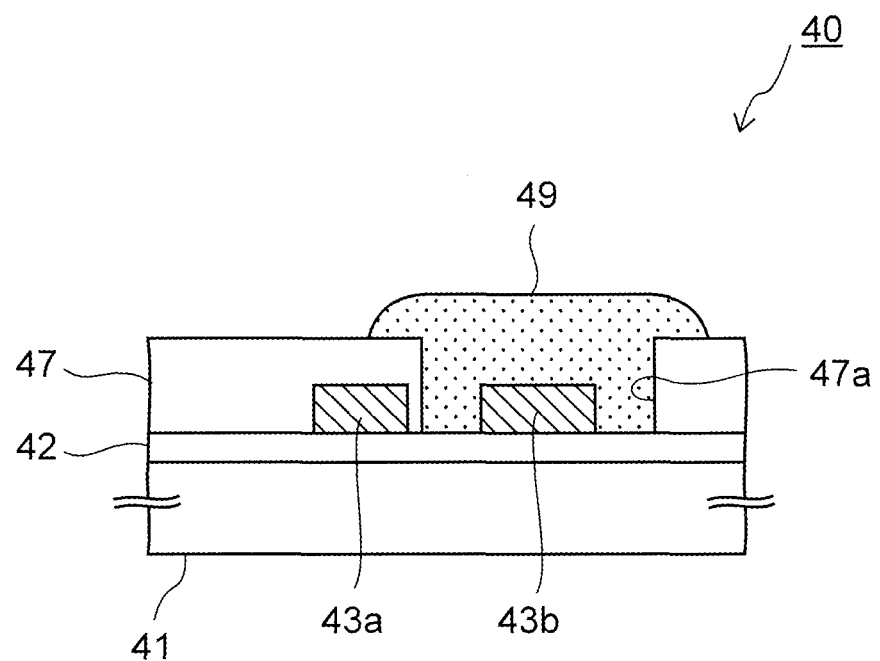

Thereafter, depending on whether the optical signal is to be branched off between the optical waveguides 43a, 43b or not, the resin 49 is filled in the opening 47a with a dispenser as illustrated in FIG. 12E. Note that whether the resin 49 causes an optical signal to branch off may be determined based on the pattern 1 to the pattern 4 in FIGS. 8 to 11.

Also, in the case where the resin 49 is filled in the opening 47a, a liquid optical adhesive having a refractive index greater than or equal to the refractive index of the cladding layer 47 is preferably used as the resin 49, so that the effective refractive index of the second optical waveguide 43b can be greatly changed than the case where the air is present in the opening 47a.

Such a liquid optical adhesive includes OG116-31 (manufactured by Epoxy Technology, Inc), which has a refractive index of about 1.50 to 1.55, for example. Then after filling the resin 49 in the opening 47a in this manner, the resin 49 is irradiated by ultraviolet to be solidified.

Note that instead of using a dispenser as above, a photo-curable resin may be formed as the resin 49 on the entire upper face of the cladding layer 47. In this case, the resin may be subjected to exposure and development to be left in the opening 47a.

Alternatively, the resin 49 may be applied onto the entire upper face of the cladding layer 47 and dried. In this case, an unnecessary portion of the resin 49 may be removed with a high-output laser, so that the resin 49 is left only in the opening 47a.

By these steps, the basic structure of the optical branching waveguide 40 according to the present embodiment is completed.

(Second Embodiment)

In the present embodiment, an optical device utilizing the optical branching waveguide 40 described in the first embodiment will be described.

Figure 13:
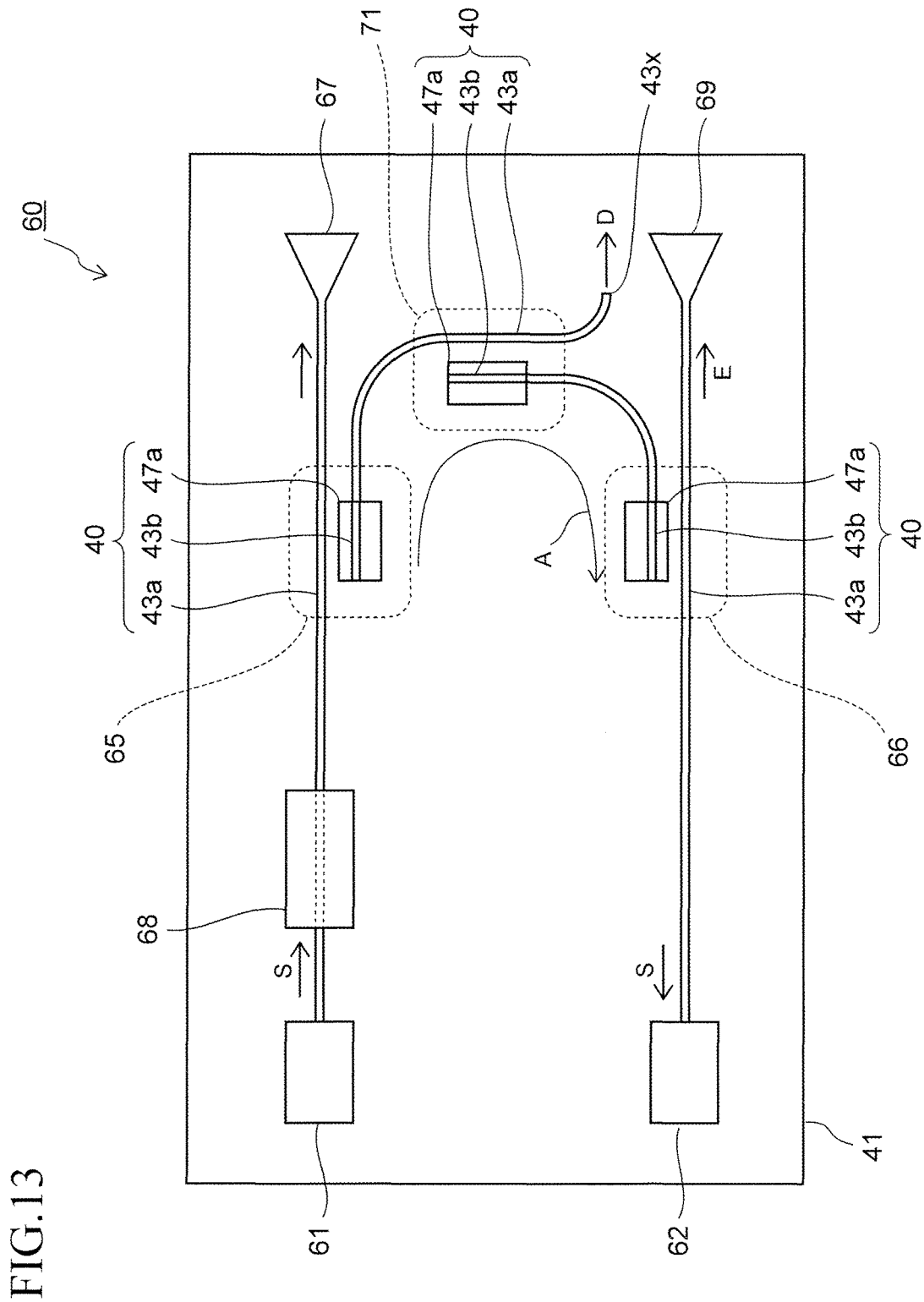
FIG. 13 is a plan view of an optical device according to a second embodiment.

FIG. 13 is a plan view of the optical device 60.

Note that the same elements in FIG. 13 as those described in the first embodiment will be denoted by the same reference numerals as those in the first embodiment, and description thereof will be omitted below.

This optical device 60 is an optical transceiver including a silicon substrate 41, and a light emitting element 61 and a light receiving element 62 are provided on the silicon substrate 41.

Among these, the light emitting element 61 is a laser diode which outputs an optical signal S. On the other hand, the light receiving element 62 is a photodiode which converts an optical signal S into an electric signal.

Moreover, this optical device 60 is provided with the optical branching waveguides 40 according to the first embodiment as a first switch portion 65 and a second switch portion 66, respectively.

Each of these optical branching waveguides 40 has a straight first optical waveguide 43a in which an optical signal S propagates, and a second optical waveguide 43b to which the optical signal S branches off from the first optical waveguide 43a.

Among these, the first optical waveguide 43a provided in the first switch portion 65 has one terminal connected to the light emitting element 61, and other terminal connected to a first grating coupler 67.

The first grating coupler 67 is a diffraction grating famed at the same layer as the first optical waveguide 43a, and changes the direction of propagation of the optical signal S to a direction obliquely upward from the substrate 41. Also, at an intermediate point of the first optical waveguide 43a, a modulator 68 is provided that modulates the optical signal S propagating in the first optical waveguide 43a based on an electric signal.

On the other hand, the first optical waveguide 43a provided in the second switch portion 66 has one terminal connected to the light receiving element 62, and other terminal connected to a second grating coupler 69.

The second grating coupler 69 is a diffraction grating famed at the same layer as the first optical waveguide 43a. The second grating coupler 69 changes the direction of propagation of the optical signal S incident thereon from obliquely above the substrate 41 into a lateral direction of the substrate, thereby guiding the optical signal S to the first optical waveguide 43*a*.

Note that in this example, extending directions E of the first optical waveguides 43*a* in the first switch portion 65 and the second switch portion 66 are the same direction.

Further, between the first switch portion 65 and the second switch portion 66, a connection portion 71 is provided which optically connects the second optical waveguides 43*b* in these switch portions 65, 66 to each other.

The connection portion 71 is the other optical branching waveguide 40, which is different from the waveguides 40 provided as the switch portions 65, 66.

In this example, the second optical waveguide 43*b* in the first switch portion 65 and the first optical waveguide 43*a* in the connection portion 71 are optically connected.

Moreover, the second optical waveguide 43*b* in the second switch portion 66 and the second optical waveguide 43*b* in the connection portion 71 are optically connected.

Various tests are performed to the optical device 60 in order to confirm its performance, after the manufacturing process of the optical device 60 is completed.

In the present embodiment, air is filled in the openings 47*a* of each of the switch portion 65, 66 and the connection portion 71 in these tests, and the resin 49 is filled in these opening 47*a* after the tests are finished. In this way, the paths of the optical signals S can be easily changed between the test and actual use.

Consider, for example, a test on the modulator 68.

At the time of the test, in order to create a path A for the test, air is filled in the openings 47*a* of each of the switch portion 65, 66 and the connection portion 71, so that the optical path can branch off when air is filled in the opening 47*a*. To make the optical path branch off in this manner, the pattern 1 in FIG. 8 or the pattern 3 in FIG. 10 may be employed as the structure of each optical branching waveguide 40.

In this way, the optical signal S modulated by the modulator 68 travels through the path A and reaches the light receiving element 62. Then, the light receiving element 62 can be utilized to test whether or not the optical signal S is modulated as designed by the modulator 68. As a result, an optical circuit for testing does not need to be connected to the optical device 60, and the test can therefore be carried out easily.

Then, after this test is finished, the resin 49 (see FIG. 12E) is filled into the openings 47*a* of each of the switch portion 65, 66 and the connection portion 71 to fix the optical paths in these portions such that the optical paths does not branch off after the optical device 60 is shipped as a product.

Note that the resin 49 may be used to bond optical fibers onto the first grating coupler 67 and the second grating coupler 69. In this case, the bonding of the optical fibers and the fixing of the optical paths can be performed simultaneously by applying the resin 49 to a region including the switch portion 65, 66, the grating couplers 67, 69, and the connection portion 71.

In this manner, after the optical device 60 is shipped as a product, the first optical waveguide 43*a* in each switch portion 65, 66 can be used as the actual optical waveguide through which the optical signal S travels. On the other hand, after the shipment, the second optical waveguide 43*b* in each switch portion 65, 66 can be used as a dummy optical waveguide through which the optical signal S does not travel.

Meanwhile, even when the optical signal slightly branches at each optical branching waveguide 40 after the resin 49 is filled in each opening 47*a*, the intensity of the optical signal branched at all three optical branching waveguides 40 is significantly low, since the three optical branching waveguides 40 are connected in series in this example. It is therefore possible to significantly lower the possibility of occurrence of a crosstalk between the optical signal S outputted from the light emitting element 61 and the optical signal S inputted into the light receiving element 62.

Note that, in order to further effectively suppress the occurrence of the crosstalk, a direction D of a terminal 43*x* of the first optical waveguide 43*a* in the optical branching waveguide 40 at the connection portion 71 is preferably set to be the same as the extending direction E of the first optical waveguide 43*a* in each switch portion 65, 66. In this way, even when the optical signal S leaks from the terminal 43*x*, the leaked optical signal S does not incident on the first optical waveguide 43*a* in either switch portion 65, 66. Therefore, it is possible to suppress the occurrence of a crosstalk between these optical waveguides 43*a*.

According to the above-described present embodiment, it is possible to create the path A, which is used only in a test, by filling air in the opening 47*a* of each optical branching waveguide 40.

Then, after the test is finished, by filling the resin 49 into the opening 47*a*, it is possible to easily switch from the path A for the test to the path for product and fix the optical path of the optical signal S.

Note that, conversely to the above, it is also possible to create the path A for the test by filling the resin 49 into the opening 47*a* of each optical branching waveguide 40, and stop the optical path from branching off at each optical branching waveguide 40 by removing the resin 49 from the opening 47*a* after the test is finished. In this case, the pattern 2 in FIG. 9 or the pattern 4 in FIG. 11 is employed as the structure of each optical branching waveguide 40.

Further, it is preferable to fill liquid resin 49 in the opening 47*a* to facilitate the removal of the resin 49 from the opening 47*a* after the test. The method of removing the resin 49 is not particularly limited. The resin 49 may be removed by washing or removed by dissolving the resin 49 with a solvent.

(Third Embodiment)

In the present embodiment, an optical device different from the second embodiment will be described.

Figure 14:
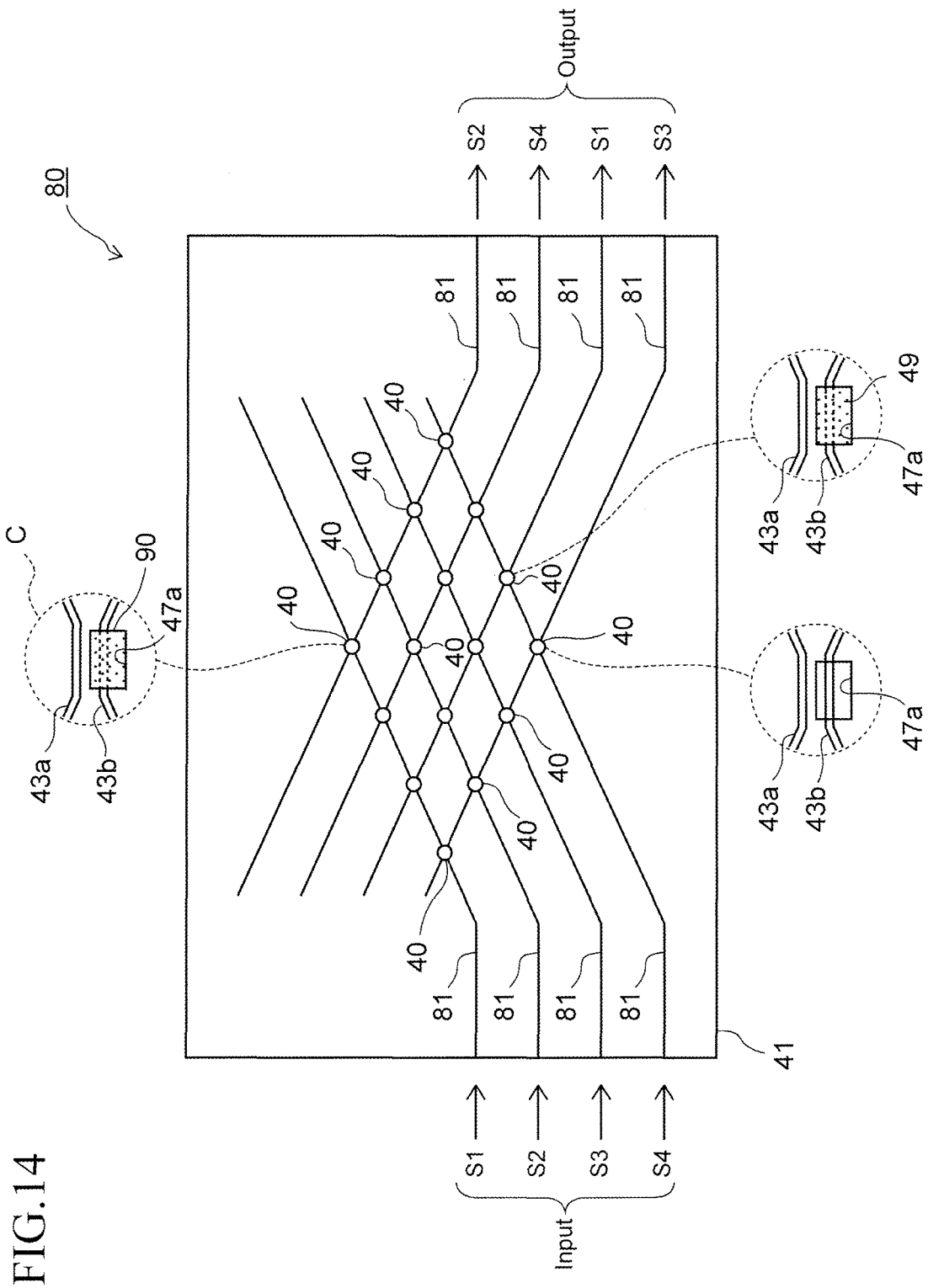
FIG. 14 is a plan view of an optical device according to a third embodiment.

FIG. 14 is a plan view of the optical device 80.

Note that the same elements in FIG. 14 as those described in the first embodiment will be denoted by the same reference numerals as those in the first embodiment, and description thereof will be omitted below.

This optical device 80 is a 4×4 optical switch, which includes a silicon substrate 41 and a plurality of optical branching waveguides 40 provided thereon in a matrix.

The structure of each optical branching waveguide 40 is not particularly limited. The optical device 80 may employ optical branching waveguides 40 having any of the structures of the pattern 1 to the pattern 4, which are illustrated in FIGS. 8 to 11.

These optical branching waveguides 40 are optically connected to each other by a plurality of optical waveguide 81 formed on the silicon substrate 41 by the same process for the optical waveguides 43*a*, 43*b*.

Four optical waveguides 81 are provided on each of the input side and the output side, and optical signals S1 to S4 are inputted into the four optical waveguides 81 on the input side, respectively. Then, after the order of the optical signals S1 to S4 is converted by the optical branching waveguides 40, these optical signals S1 to S4 are outputted from the four optical waveguides 81 on the output side.

Note that in each optical branching waveguide 40, the optical path is fixed to one of the first optical waveguide 43a and the second optical waveguide 43b or the optical path is fixed to shift from the first optical waveguide 43a to the second optical waveguide 43b, depending on whether the resin 49 is filled in the opening 47a or not.

According to the optical device 80, the optical paths of the optical signals S1 to S4 can be easily fixed without changing the layout of the plurality of optical branching waveguides 40 and optical waveguides 81, depending on whether the resin 49 is filled into the opening 47a of the optical branching waveguides 40 or not.

Therefore, the switching destinations of the optical signals S1 to S4 can be easily set by completing the optical device 80 without the resin 49 filled in any of the openings 47a and letting the designer or buyer fill the resin 49 into given openings 47a afterward.

Note that how the optical paths is fixed by the filling of the resin 49 into the opening 47a differs depending on which of the pattern 1 to the pattern 4 in FIGS. 8 to 11 is used.

For example, in the pattern 1 in FIG. 8, the optical path branches off from the first optical waveguide 43a to the second optical waveguide 43b when air is present in the opening 47a, while the optical path does not branch off when the resin 49 is filled in the opening 47a.

In the case where the optical path does not branch off in this manner, the first optical waveguide 43a becomes the actual optical waveguide through which any one of the first to fourth optical signals S1 to S4 travels, while the second optical waveguide 43b becomes a dummy optical waveguide through which none of the first to fourth optical signals S1 to S4 travels.

Conversely to the above, in the case where the optical path does not branch off when air is present in the opening 47a as in the pattern 2 (see FIG. 9), the first optical waveguide 43a becomes a dummy optical waveguide, while the second optical waveguide 43b becomes the actual optical waveguide.

Note that, in the case where air is present in the opening 47a in actual use, there is a possibility that foreign materials enter the opening 47a, and the foreign materials raise the refractive index inside the opening 47a. When this is the case, in the pattern 1 (see FIG. 8) for example, the optical path may possibly fail to branch off due to the foreign materials although the optical path is set to branch off by filling air in the opening 47a.

To avoid this, as illustrated in dotted circles C in FIG. 14, it is preferable to fill resin 90 different from the resin 49 for each optical branching waveguide 40 intended to be used by filling its opening 47a with air in actual use, so that foreign materials are prevented from entering the opening 47a.

The resin 90 is filled in the opening 47a in place of air. When the refractive index of the resin 90 is too high, an optical path different from the optical path created in the case where air is present in the opening 47a is famed in the optical branching waveguide 40. Therefore, resin having a lower refractive index than the refractive index of the cladding layer 47 (see FIG. 12E) is preferably used as the resin 90. For example, a fluorine-containing optical adhesive having a refractive index of about 1.30 to 1.35 is available as such resin 90.

According to the above-described present embodiment, depending on whether the resin 49 is filled into the opening 47a or not, it is possible to easily set the switching destinations of the optical signals S1 to S4, without changing the layout of the optical branching waveguides 40 and the optical waveguides 81.

All examples and conditional language recited herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical branching waveguide comprising:
   a substrate;
   a first optical waveguide provided on the substrate, the first optical waveguide including a first portion;
   a second optical waveguide provided on the substrate and arranged close to the first optical waveguide, the second optical waveguide including a second portion; and
   a cladding layer covering one of the first optical waveguide and the second optical waveguide and including an opening overlapping the other of the first optical waveguide and the second optical waveguide, the other of the first optical waveguide and the second optical waveguide being exposed from the cladding layer to air in the opening,
   wherein an effective refractive index of the first optical waveguide at the first portion and an effective refractive index of the second optical waveguide at the second portion become equal in one of a state where resin is present in the opening and a state where resin is not present in the opening, so that an optical path of an optical signal traveling in the first optical waveguide switches from the first optical waveguide to the second optical waveguide,
   wherein the optical path of the optical signal remains in the first optical waveguide without switching to the second optical waveguide in the other of the state where resin is present in the opening and the state where resin is not present in the opening.

2. The optical branching waveguide according to claim 1, wherein
   the first optical waveguide and the second optical waveguide are arranged side by side in a partial region of the substrate, where the partial region including the first portion and the second portion, and
   a width of either one of the first optical waveguide and the second optical waveguide in the partial region is changed like a taper.

3. The optical branching waveguide according to claim 2, wherein
   a first width of the first optical waveguide in the partial region is fixed,
   a second width of the second optical waveguide in the partial region is changed like a taper,
   the opening overlaps the second portion of the second optical waveguide, and
   a minimum value of the second width in the partial region is set to be greater than the first width such that the effective refractive index of the first optical waveguide at the first portion and the effective refractive index of the second optical waveguide at the second portion become equal in the state where the resin is not present in the opening.

4. The optical branching waveguide according to claim 2, wherein
a first width of the first optical waveguide in the partial region is fixed,
a second width of the second optical waveguide in the partial region is changed like a taper,
the opening overlaps the second portion of the second optical waveguide, and
a maximum value of the second width in the partial region is set to be less than the first width such that the effective refractive index of the first optical waveguide at the first portion and the effective refractive index of the second optical waveguide at the second portion become equal in the state where the resin is present in the opening.

5. The optical branching waveguide according to claim 2, wherein
a first width of the first optical waveguide in the partial region is changed like a taper,
a second width of the second optical waveguide in the partial region is fixed,
the opening overlaps the first portion of the first optical waveguide, and
a minimum value of the first width in the partial region is set to be greater than the second width such that the effective refractive index of the first optical waveguide at the first portion and the effective refractive index of the second optical waveguide at the second portion become equal in the state where the resin is not present in the opening.

6. The optical branching waveguide according to claim 2, wherein
a first width of the first optical waveguide in the partial region is fixed,
a second width of the second optical waveguide in the partial region is changed like a taper,
the opening overlaps the first portion of the first optical waveguide, and
a minimum value of the second width in the partial region is set to be greater than the first width such that the effective refractive index of the first optical waveguide at the first portion and the effective refractive index of the second optical waveguide at the second portion become equal in the state where the resin is present in the opening.

7. The optical branching waveguide according to claim 1, wherein
a refractive index of the resin is greater than or equal to a refractive index of the cladding layer.

8. The optical branching waveguide according to claim 1, wherein
the opening overlaps either one of the first optical waveguide and the second optical waveguide and does not overlap the other one of the first optical waveguide and the second optical waveguide.

9. An optical device comprising:
an optical branching waveguide including a first optical waveguide and a second optical waveguide, where an optical path of an optical signal being fixed to either one of the first optical waveguide and the second optical waveguide, or the optical path being fixed to shift from the first optical waveguide to the second optical waveguide,
wherein the optical branching waveguide includes:
a substrate on which the first optical waveguide and the second optical waveguide are provided close to each other; and
a cladding layer covering one of the first optical waveguide and the second optical waveguide and including an opening overlapping the other of the first optical waveguide and the second optical waveguide, the first optical waveguide including a first portion, and the second optical waveguide including a second portion,
wherein an effective refractive index of the first optical waveguide at the first portion and an effective refractive index of the second optical waveguide at the second portion become equal in one of a state where resin is present in the opening and a state where resin is not present in the opening, so that an optical path of an optical signal traveling in the first optical waveguide switches from the first optical waveguide to the second optical waveguide,
wherein the optical path of the optical signal remains in the first optical waveguide without switching to the second optical waveguide in the other of the state where resin is present in the opening and the state where resin is not present in the opening.

10. The optical device according to claim 9, wherein
two of the optical branching waveguides are provided, and
the optical device further comprising:
a light emitting element optically connected to the first optical waveguide of one of the optical branching waveguides;
a light receiving element optically connected to the first optical waveguide of the other optical branching waveguide; and
a connection portion optically connecting the second optical waveguides of the two optical branching waveguides to each other.

11. The optical device according to claim 10, wherein
the connection portion is provided with an another optical branching waveguide which is different from the two optical branching waveguides,
the second optical waveguide of the one optical branching waveguide and the first optical waveguide of the another optical branching waveguide are optically connected, and
the second optical waveguide of the other optical branching waveguide and the second optical waveguide of the another optical branching waveguide are optically connected.

12. The optical device according to claim 11, wherein
a terminal of the first optical waveguide of the another optical branching waveguide is directed toward a same direction as extending directions of the first optical waveguides of the two optical branching waveguides.

13. The optical device according to claim 9, wherein
a plurality of the optical branching waveguides are provided on the substrate in a grid pattern, and
the plurality of optical branching waveguides are optically connected to each other.

14. The optical device according to claim 13, wherein
an other resin being different from the resin and having a refractive index less than a refractive index of the cladding layer is filled in a part of the openings of the plurality of optical branching waveguides.

* * * * *